Sept. 12, 1961 YASUSHI HOSHINO ET AL 2,999,908

DEVICE FOR HOLDING A MASTER MAGNETIC RECORD SHEET AND A MAGNETIC RECORD SHEET TO BE PRINTED IN A CORRECT OVERLAPPING RELATIONSHIP IN PRINTING OPERATION

Filed June 2, 1959 2 Sheets-Sheet 1

Sept. 12, 1961 YASUSHI HOSHINO ET AL 2,999,908

DEVICE FOR HOLDING A MASTER MAGNETIC RECORD SHEET AND A MAGNETIC RECORD SHEET TO BE PRINTED IN A CORRECT OVERLAPPING RELATIONSHIP IN PRINTING OPERATION

Filed June 2, 1959 2 Sheets-Sheet 2

United States Patent Office 2,999,908
Patented Sept. 12, 1961

2,999,908

DEVICE FOR HOLDING A MASTER MAGNETIC RECORD SHEET AND A MAGNETIC RECORD SHEET TO BE PRINTED IN A CORRECT OVERLAPPING RELATIONSHIP IN PRINTING OPERATION

Yasushi Hoshino, 462 1-chome, Tamagawa Okusawa-cho, Setagaya-ku, and Mamoru Namikawa, 664 Kugahara-cho, Ota-ku, both of Tokyo, Japan, and Shigezo Tochihara, Kawasaki-shi, Kanagawa, Japan (531 Matsunoki-Jyutaku, Matsunoki-cho, Suginami-ku, Tokyo, Japan)

Filed June 2, 1959, Ser. No. 817,557
Claims priority, application Japan June 3, 1958
1 Claim. (Cl. 179—100.2)

This invention relates to a device for holding a master magnetic record sheet and a magnetic record sheet to be printed (hereafter called "print sheet") in a correct overlapping relationship in printing operation, and more particularly, a device for holding a master record sheet and a print sheet which is used on a magnetic sound record sheet as described in copending U.S. patent application 635,504 in a correct overlapping relationship in printing operation.

The characteristics and merits of the present invention will be made clear by the following descriptions made with reference to accompanying drawings, in which.

Before explaining the present invention, a short explanation will be made about a magnetic sound record sheet used on a magnetic sound record reading machine of patent.

Figure 1:
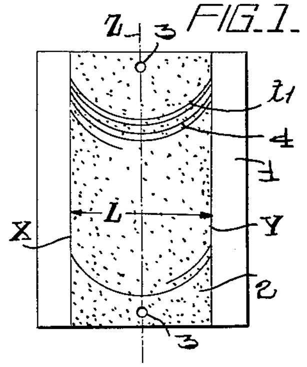
FIG. 1 is a plan view of a magnetic sound record sheet which is used on a magnetic sound record reading machine.

The magnetic sound record sheet has a basic carrier 1 made of a material such as paper or plastic as shown in FIG. 1. On the front surface it has descriptions comprising letters, pictures, photographs or other visible marks as desired, and on the back surface a magnetic film 2 of a width L coated between two parallel lines X and Y. In the center line Z of said magnetic film, setting holes 3, 3 are provided to set the sheet in a definite position on a magnetic sound record reading machine which has a turn table provided with sound recording and reproducing heads on its circumference. This turn table is shiftable in longitudinal direction while it is being rotated around its axis. When the magnetic sound record sheet is set on a magnetic sound record reading machine, facing its magnetic film downwardly, and the turn table is rotated and shifted below the sheet, one of the heads of the turn table comes in contact with the magnetic film by turns to record sound tracks of an arc shape or to reproduce sound by scanning the sound tracks of an arc shape.

It is apparent that it is important that the magnetic sound record sheet is placed in same position on the magnetic sound record reading machine at the time of recording and reproducing, or satisfactory recording and reproducing cannot be attained.

Figure 2:
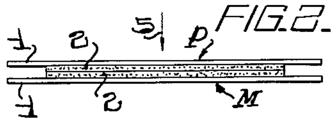
FIG. 2 is a side view of a master sheet and a print sheet overlapped ready for printing operation.

Now the present invention will be explained. In the sound recording operation as described above, one recorded sheet is obtained by one recording operation. But it is desirable very often to have a number of sound record sheets for various purposes. It is generally known to manufacture a number of printed magnetic sound record sheets from a master magnetic sound record sheet by applying a magnetic field to a magnetic sound record sheet maintained in contact with a master sheet. For example, if a master sheet M comprising a carrier 1 and a magnetic film 2 having recorded sound tracks and a print sheet comprising a carrier 1 and a magnetic film 2 with no sound tracks are overlapped contacting their magnetic films with each other as shown in FIG. 2, and a magnetic field caused by direct electric current or alternative electric current is applied from the direction of 5, and then the two sheets are separated, the print sheet P will have printed sound tracks on its magnetic film. This is the principle of magnetic printing of sound tracks.

Figure 3:
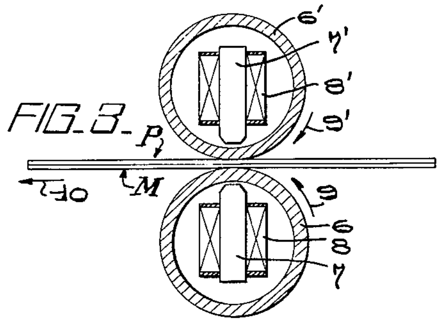
FIG. 3 is a sectional side view of a master sheet and a print sheet under printing operation.

FIG. 3 illustrates one of the apparatus for carrying out such printing operation. In the drawing, a pair of rollers 6, 6' have electro-magnets 7, 7' provided with coils 8, 8' respectively accommodated therein. The rollers are rotated in the directions 9 and 9' respectively by a device not shown. A master sheet M and a print sheet P maintained in overlapping relationship as shown in FIG. 2 is passed between the two rollers 6, 6' to proceed in the direction of 10 while the coils 8, 8' are energized to produce a magnetic field between the ends of the electro-magnets 7, 7'. By this means, printing on the print sheet P from the master sheet M can be effected.

Figure 4:
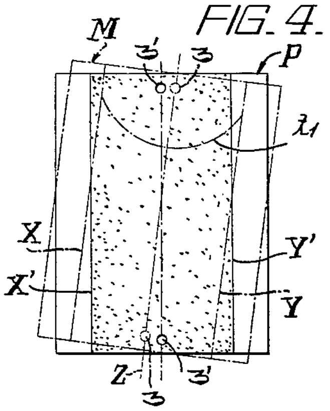
FIG. 4 is a plan view illustrating a master sheet and a print sheet in incorrect overlapping relationship.
Figure 5:
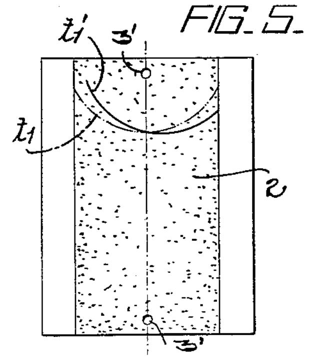
FIG. 5 is a plan view of a printed sheet which has unsatisfactory sound tracks caused by incorrect overlapping relationship as illustrated in FIG. 4.

However, in the printing operation, it is important that the magnetic coating films of the master sheet and the print sheet are in the condition of accurate registration from the beginning to the end of the operation. In other words, the border lines X and Y of the two sheets must coincide accurately with each other. If the two sheets are in the incorrect overlapping relationship as shown in FIG. 4, sound tracks of the master sheet M cannot be printed correctly on the print sheet. In the drawing, X and Y are the border lines and Z is the center line of the magnetic coating film of the master sheet M and X' and Y' are the border lines and Z' is the center line of the magnetic coating film of the print sheet P. As shown in the drawing, a sound track $t_1$ of the master sheet M is only partly covered by the magnetic coating film of the print sheet P, accordingly the printed sound track on the print sheet will be $t_1'$ instead of $t_1$ as shown in FIG. 5. When the print sheet P is set on a magnetic sound record reading machine by means of its setting holes 3', 3', there will be no sound reproduced on the left side part of the magnetic coating film and the reproduction of sound corresponding to the right end part of the sound track $t_1$ will be missed.

To overlap the master sheet and the print sheet in correct relationship, however, is not easy, and further, even if they are overlapped in correct relationship in the beginning, they are likely to slip from each other during the operation as illustrated in FIG. 3.

The object of this invention is to provide a device which makes it easy to bring the two sheets in correct overlapping relationship and to maintain these two sheets in this correct condition throughout the printing operation.

The basic principle of the present invention is to hold a master sheet and a print sheet between two holding plates during the operation of printing so that any slip between the two sheets may be prevented.

Figure 6:
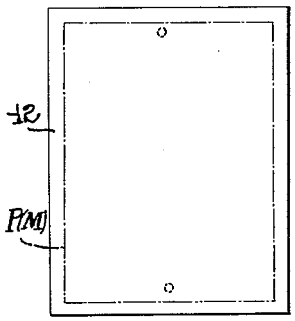
FIGS. 6 and 7 are a plan view and a side view of a master sheet and a print sheet in correct overlapping relationship by holding plates according to the present invention.
Figure 7:
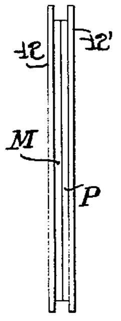

FIGS. 6 and 7 illustrate one of the embodiment of the holding device according to the present invention. In the drawing, 12, 12' are a pair of holding plates between which a master sheet M and a print sheet P are inserted and pressed from both sides. These holding plates are preferably made of a transparent material such as transparent plastic. Accordingly the sheets M and P are visible through the plates 12, 12'. This transparency is useful for securing correct overlapping relationship between the two sheets. When the holding plates as described above are used, some marks may be provided on the plates for placing the sheets in correct position so that the overlapping of the two sheets can be easily attained. During the printing operation, the sheets are subjected to perpendicular force but not to horizontal force which may cause slipping between the two sheets, and they are maintained in correct overlapping relationship to accomplish satisfactory printing.

Figure 8:
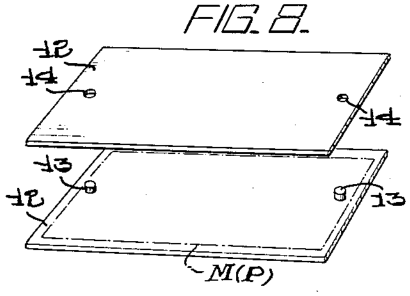
FIG. 8 is a perspective view of a pair of holding plates of another embodiment of the present invention.

The device illustrated in FIG. 8 is more convenient than the device of FIGS. 6 and 7. One of the holding plates 12 has setting pins 13, 13 which are adapted to engage with the setting holes 3, 3 of a master sheet and the setting holes 3', 3' of a print sheet P. When the master sheet M and the print sheet P are set on the holding plate 12 by engaging the setting pins 13, 13 with their setting holes, the two sheets are placed in accurate overlapping relationship. Thus the overlapping operation can be carried out very easily. The other holding plate 12' has escape holes 14, 14 in the position corresponding to the setting pins 13, 13 of the first holding plate 12 and, after placing the two sheets M, P on the first holding plate 12, the second holding plate 12' is placed on them by engaging the escape holes 14, 14 with the setting device. The two sheets M, P held between the two plates 12, 12' receive the printing operation by an apparatus as illustrated in FIG. 3. It is apparent that the two sheets can be easily brought in correct overlapping relationship and maintained in this condition with no slip between them during the printing operation, when this device is used.

The device of FIG. 8, however, has still a difficulty when the sheet is elongated or shrunk due to the change of moisture and temperature of the atmosphere or to some other reasons, since the distance of the setting pins is practically constant while the length of the sheets and consequently the distance between the setting holes of the sheet is variable. Furthermore, it is also possible that the master sheet and the print sheet are made of different kinds of paper and the rate of elongation or shrinkage of one sheet is different from that of the other sheet.

Figures 9, 10, 11, 12, 13, 14, 15:
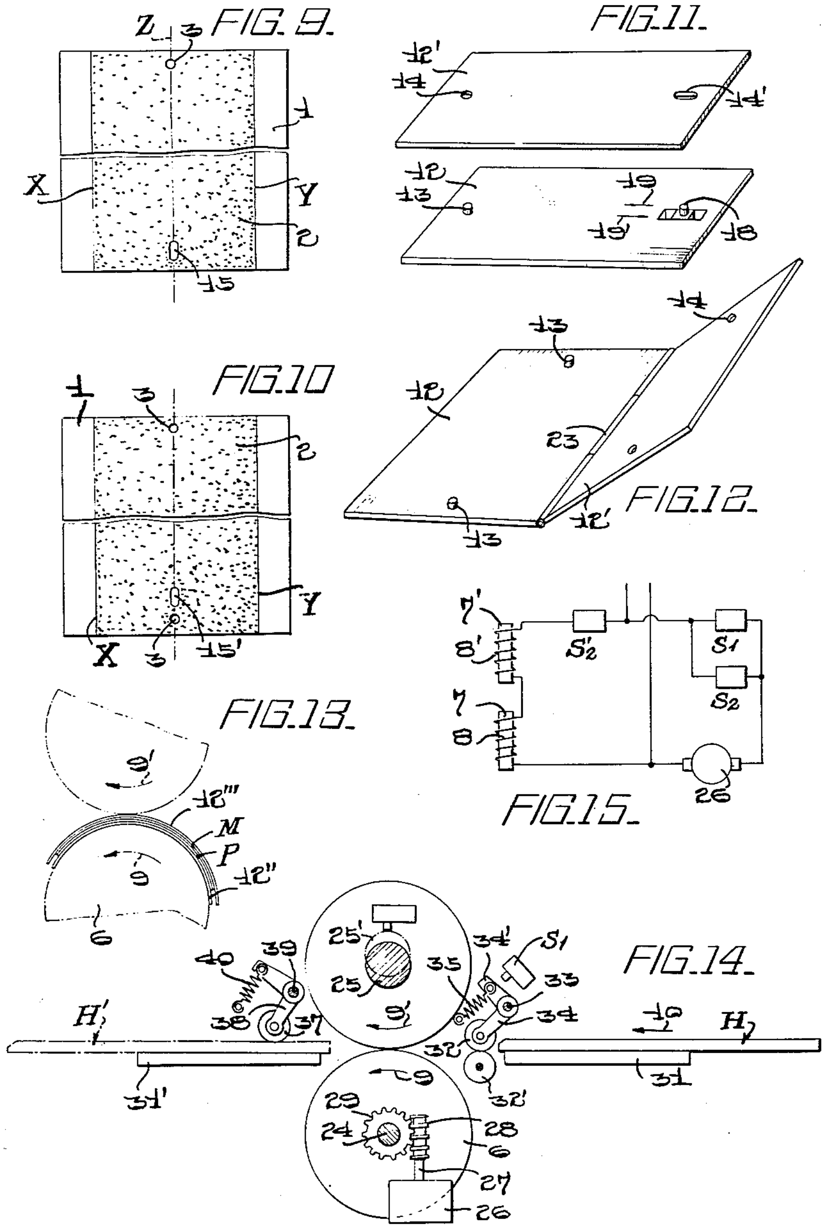
FIGS. 9 and 10 are plan views of a magnetic sound record sheet which has an elongated hole and is suitable to be held by the holding plates of the present invention respectively.
FIG. 11 is a perspective view of a pair of holding plates according to another embodiment of the present invention.
FIG. 12 is a perspective view of a pair of holding plates joined by a hinge according to another embodiment of the present invention.
FIG. 13 is a side sectional view of a circular holding device according to still another embodiment of the present invention.
FIG. 14 is a side view showing a printing apparatus suitable for the exercise of the printing operation on a print sheet from a master sheet using the holding device of the present invention.
FIG. 15 is a diagrammatic view of a wiring system used for the printing apparatus of FIG. 14.

In order to eliminate this difficulty, according to the present invention, a setting hole on one side of the master sheet and the print sheet may be made in the form of an elongated slot 15 extending in the direction of the center line of the magnetic coating film and having a width equal to the diameter of the corresponding setting pin 13 on the holding plate 12. FIG. 9 illustrates one of the embodiments of such a sheet. In this embodiment, a setting hole 3 is a usual setting hole used for setting the sheet on a magnetic sound record reading machine. However, another setting hole 15 is made into the form of an elongated slot extending in the line of the center line Z. Because of this elongated form of the hole, the sheet may be set on the setting pin 13 of the holding plate 12 with no difficulty despite the elongation or shrinkage of the sheet. The difference of the elongation or shrinkage between the master sheet and the print sheet may also be accommodated by the elongated slots provided in these sheets.

In the sheet of FIG. 9, it is important that the slot 15 has a width equal to the diameter of the setting pin 13 of the holding plate. If the width of the slot is larger than the diameter of the setting pin, the sheet may rotate around the other pin to right or left in the limit of the width and such rotation may cause discrepancy in overlapping relationship between the master sheet and the print sheet. If such discrepancy takes place, unsatisfactory printing will result as explained with reference to FIGS. 4 and 5.

In FIG. 9, the slot 15 is a hole used for setting the sheet on a magnetic sound record reading machine. However, a separate slot 15 may be provided independently from such a setting hole 3. FIG. 10 illustrates a sheet having such independent slot 15 exclusively for the use of setting the sheet on a holding plate 12. In such a case, it is a matter of course that the setting pin 13 on the holding plate 12 is positioned at a point different from the distance between the setting pins on a magnetic sound record reading machine.

FIG. 11 illustrates another device for accommodating the change of the length of a sheet due to the change of moisture and temperature of the atmosphere. In this embodiment, one of the setting pins 13 is fixed but another setting pin 18 is slidably mounted in a slot provided on the holding plate 12. The other holding plate 12' has an escape hole 14 and an escape slot hole 14' in positions corresponding to the fixed setting pin 13 and the slidable setting pin 18. The slidable pin 18 is slidable in the directions of 19 and 19' but normally urged outwardly by a spring. Accordingly a sheet set on the holding plate 12 is stretched by the outwardly urged sliding pin 18. There is no special device for accommodating the difference of elongation or shrinkage between a master sheet and a print sheet, but so long as they are made of similar material, the elongation or shrinkage is same, and therefore no difficulty will occur. If they are made of different kinds of paper or material and the difference in elongation and shrinkage is appreciable, one of the holdes of either the master sheet or the print sheet may be made in the form of an elongated slot hole as explained with reference to FIG. 9.

In FIG. 8, a device comprising two holding plates is illustrated. But when a holding plate having setting pins 13 is used, the associated plate 12' may be omitted.

When the setting pins 13, 13 are projected beyond the top surface of the holding plate 12', they may interfere with the passage between the rollers 6, 6' of the assembly of the holding plates 12, 12' and the sheets M and P held between said plates. In order to avoid such difficulty, the pins 13, 13 may be supported yieldably in their positions so that they may be pushed down when they are pressed by the rollers 6, 6'.

FIG. 12 illustrates still another embodiment of a set of holding plates. In this embodiment, the holding plates 12, 12' are joined together by a hinge 23 so that they may be opened and closed. When the plates are joined as in this embodiment, it is more convenient to handle them.

While all the embodiments above described comprise a pair of flat plates, the flat plates may be replaced with arch shape plates as illustrated in FIG. 13. In the drawing, 12'', 12''' are arch shape plates which take place of flat plates of 12 and 12' of FIG. 7 or FIG. 8 and a master sheet M and a print sheet are held between them. The arch shape plate may have a curvature corresponding to the outside surface of one of the rollers 6, 6′ or a curvature of a greater radius.

FIG. 14 is a diagrammatic view of an apparatus by which printing is carried out on a print sheet from a master sheet held by the holding device according to the present invention. H represents the assembly of the holding device comprising the holding plates 12, 12′ and a master sheet M and a print sheet P before printing operation, and H′ represents the same assembly after printing operation. 6, 6′ are rollers in which electro-magnets as shown in FIG. 3 are provided. 24 and 25 are the shafts of the rollers 6 and 6′ and the shaft 24 is rotated in the direction of 9 by a motor 26 through the shaft 27 of the motor, a worm 28 on said shaft and a worm gear 29 integral with the shaft 24 of the roller 6. The shaft 25 of the roller 6′ is pulled down by a spring (not shown) in the direction of 30 to press the assembly of the holding plates H against the roller 6 but is shiftable upwardly when said assembly enters between the two rollers 6, 6′. 31 and 31′ are supporting tables for the assembly H before printing and H′ after printing. Between the table 31 and a pair of rollers 6, 6 are provided a set of rollers 32 and 32′. The roller 32′ is mounted rotatably in a fixed position while the roller 32 is rotatably supported by an elbow 34 pivoted at 33. This elbow is pulled by a spring 35 attached at the other end of the elbow to rotate the elbow in counterclockwise direction to bear the roller 32 against the fixed roller 32′. When the assembly H is pushed forward to enter between the rollers 32, 32′, the roller is raised to turn the elbow around the pivot 33 in clockwise direction against the spring 35 and the other end 34′ of the elbow is brought into contact with a switch $S_1$ to operate it. This switch energizes the motor 26 to rotate the roller 6. When the assembly H is advanced further to enter between the rollers 6 and 6′, the shaft 25 of the roller 6′ is raised to the position of 25′ to operate two switches $S_2$ and $S_2'$ which are provided in one switch box. The switch $S_2$ acts to energize the motor 26 in cooperation with the switch $S_1$ while the other switch $S_2'$ acts to energize the electric coils 8, 8′ in the rollers 6, 6′ to establish a magnetic field. The rollers 6, 6′ are rotated and the assembly H is advanced forward. When the tail end of H is passed through below the roller 32, the elbow 34 is returned to the original position by the action of the spring 35 and the contact at the switch $S_1$ is cut off. However, the switch $S_2$ is still on and the motor 26 is still operated. When the assembly H is further advanced and passed below the roller 6′, the roller 6′ and consequently the shaft thereof is lowered from the position of 25′ to the original position 25. Accordingly the two switches $S_2$, $S_2'$ are cut off to stop the motor 26 and to extinguish the magnetic field. In the drawing, 37 is a roller which is mounted rotatably at one end of an elbow member 38 beyond the rollers 6, 6′. This elbow member 38 is pivoted at 39 and rotated by a spring 40 to press the assembly H downward by the roller. Due to the presence of this device, the assembly H which has passed below the roller 6′ is still pressed down even after passing through the magnetic field to maintain good holding of a master sheet and a print sheet.

FIG. 15 illustrates a wiring system for performing the operations of the apparatus of FIG. 14 as described above. By this system and the arrangement as described above, all the operations can be carried out automatically, securely and safely electrically to achieve satisfactory printing.

We claim:

An apparatus for printing a printed magnetic sound record sheet from a master magnetic sound record sheet by applying a magnetic field, comprising a pair of main rollers, an electro-magnet in said rollers, a pair of holding plates between which a master sheet and a print sheet are held in correct overlapping relationship, an auxiliary pair of rollers operatively disposed with respect to and adapted to press the holding plates and located on one side of the two main rollers, a roller on the other side of said two main rollers and adapted to press the holding plates after the same have passed between said main rollers, a device for forwarding the holding plates with a master sheet and a print sheet therebetween, a motor coupled to and rotating one of the main rollers, a switch coupled to and controlling the rotation of the motor, another switch for controlling the rotation of the motor, a switch for energizing the electro-magnets in the main rollers, and a system which operates the first switch for controlling the rotation of the motor when the holding plates reach the auxiliary pair of rollers to rotate the main roller, operates the second switch for controlling the rotation of the motor and the switch for energizing the electro-magnets to establish a magnetic field between the main rollers when the holding plates enter between the two main rollers, and then cuts off the first switch when the tail end of the holding plates passes the auxiliary rollers and the second switch and the switch for energizing the electro-magnets when the tail end of the holding plates has passed between the main rollers.

References Cited in the file of this patent

UNITED STATES PATENTS

| | | |
|---|---|---|
| 2,668,718 | Roberts | Feb. 9, 1954 |
| 2,686,229 | Blaney | Aug. 10, 1954 |
| 2,738,383 | Herr et al. | Mar. 12, 1956 |
| 2,886,330 | Halftermeyer | May 12, 1959 |